3,798,105
METHOD OF JOINING A PART TO A
MATRIX MATERIAL
Clifford George Hannah, Alvaston, Reginald Shuttleworth, Ravenshead, and Alan David McCroft, Chaddesden, England, assignors to Rolls-Royce Limited, Derby, England
No Drawing. Filed May 14, 1971, Ser. No. 143,594
Claims priority, application Great Britain, May 14, 1970, 23,374/70
Int. Cl. B32b 7/10; C09j 5/02
U.S. Cl. 156—307                                    8 Claims

ABSTRACT OF THE DISCLOSURE

Articles to be joined together, such as metal sheets or carbon fibers, are first coated with a primer coating of a tough thermoplastic resin material as a polysulphone, then a matrix material such as an epoxy resin is applied to the coated part and the matrix-primer coated part is brought together with another part, optionally similarly prepared, with pressure and heat, causing the resin to cure and an interdiffusion between the thermoplastic and the matrix material. Parts so joined together have bonds of improved strength, stronger, for example, than when the same matrix material is used but without the primer.

BACKGROUND OF THE INVENTION

The invention relates to a method of joining a part to a matrix material.

In the manufacture of components from fibre reinforced materials it is often necessary to adhere fibre reinforced materials to metals or metals to metals. The strength of the bonds may be of great importance in the properties of the final product, and the present invention provides a way in which a high strength bond from a part to a matrix of epoxy resin may be achieved, hence also making possible the adhesion of a metal part to a matrix and thus to a further metal part.

Throughout this specification the term "part" is to be understood to include both unitary structure of metal or other material and a plurality of fibres, such as carbon fibres, which are understood to comprise together such a "part."

DETAILED DESCRIPTION

According to the present invention a method of joining a part to a matrix of an epoxy resin or a mixture of an epoxy resin and a thermo plastic material comprises fusing a primer coating of the thermo plastic material to the part, applying the matrix material to the primed part and heating the matrix and part to cure the resin and to cause a degree of interdiffusion between the thermo plastic and the epoxy matrix. The matrix material may be an epoxy resin or a mixture of an epoxy resin and a thermoplastic material of the type described. When a mixture is used, the thermoplastic comprises between 1% and 70% of the total matrix, the balance, i.e. 99% to 30% being the epoxy resin.

Preferably the thermo plastic is tough and according to the end use temperature one of the following can be employed polyaryl sulphone, polyamide, phenoxy, polycarbonate, polysulphone, polyester, polyaryl ether and polyimide.

The primary operation may be performed by dissolving the thermo plastic in a solvent and coating from the liquid thus produced and subsequently fusing or may be performed directly fusing the thermo plastic onto the part.

In a particular embodiment of the invention the part to be coated comprises a plurality of fibres; these may be coated from a solution of the thermo plastic, the coated fibres then being dried and heated to fuse the thermo plastic and cause it to evenly coated the fibres, which are then impregnated with the epoxy matrix by a conventional method.

In a further embodiment of the invention the part comprises a metal member which is also coated from a solution of the thermo plastic. In this case it may be desired to adhere the metal part to a further metal part; then both parts would be coated and the matrix would merely comprise a thin film inbetween the two coatings.

Examples of the method according to the invention are as follows:

EXAMPLE 1

Carbon fibre in this instance produced by the pyrolysis of polyacrylonitrile was dip coated from a dilute solution of polysulphone thermoplastic, in methylene chloride, an example of a suitable polysulphone being Bakelite P1700. The thickness of coating was predetermined so that there would be some 10% polysulphone by volume of the total matrix material of the final product. The coated fibres were air dried and the polymer was fused in an oven at 320° C. for 5 minutes. This fusing caused the thermo plastic to give thorough penetration of the thermo plastic into the fibre bundle and to avoid the production of surface films on the fibre bundle.

The coated bundle of fibres was then impregnated with a matrix material, in this case a liquid diglycidyl ether of bisphenol A epoxy resin was used, such as Shell chemicals Epikote 828 or CIBA MY 750 hardened with diamino diphenyl sulphone at 36 parts per 100 of resin by weight. The fibre bundle was impregnated by spreading it into the form of a tape and pressing the resin into the tape from coated release paper using a pair of heated rollers.

The impregnated tape ("pre-preg") thus formed was cut into sheets, layed up and pressed to form a standard test piece. During the pressing, the test piece was heated to some 180° C., this heating step curing the resin and also causing some interdiffusion of the polysulphone and resin. The test pieces thus produced were compared with test pieces made in an identical manner from fibre which had not been pre-coated with polysulphone. The particular test method used was to propagate a crack in the matrix parallel with the fibres and to calculate the energy expended per unit nominal area of crack surface produced.

In the case of the control test pieces the energy expended gave a mean value of 150,000 ergs per square centimetre, while the test pieces made in accordance with the invention gave a mean value of 400,000 ergs per square centimeter.

EXAMPLE 2

In this example the preparation of test pieces and control test pieces was identical to that in Example 1, but in this case the matrix resin (HR4C) used was in accordance with our co-pending application Ser. No. 82,723 filed Oct. 21, 1970, now abandoned Example 1 and consisted essentially of an epoxy/polysulphones mixture. Again the test pieces in accordance with the invention were provided with a fused coating of polysulphone before laying up although in this case it was arranged that the polysulphone coating should comprise 5% of the total matrix material. Using similar tests to the above the control specimens gave a mean value of 200,000 ergs per square centimetre while the examples according to the invention gave a mean value of 280,000 ergs per square centimeter.

EXAMPLE 3

This example differs from the preceding examples in that it relates to the adherence of metal to metal through the epoxy resin. For this example test pieces were made up comprising strips of chemically etched stainless steel glued together by the adhesive to be tested. The force required to peel the two pieces of metal apart was then determined, the separating force being applied by pulling adjacent ends of the metal so that they extended at right angles to the major portion of the test piece.

As control test pieces, strips were glued together using a simple epoxy resin or an epoxy polysulphone mixture. These adhesives were used in the conventional fashion, that is they were applied as liquids or thin solid films together with the necessary hardeners etc., the strips were glued together and the completed assembly heated to cure the epoxy adhesive. A further control test piece was made using polysulphone in solution which was first applied to the strips in a succession of coats each coat being fused separately at 320° C. until a film thickness of approximately 0.002" was achieved. The strips were then pressed together and heated to some 320° C. to remove the solvent and to fuse the polysulphone. The strips were finally cooled under pressure to 100° C.

The test pieces according to the invention were made by applying a primed coating of polysulphone from a solution in methylene chloride in a manner similar to above, drying off the solvent, fusing the primer at 320° C. and then sticking the strips together using epoxy resin as the adhesive in a similar fashion to the first mentioned control test pieces except that the curing temperature used was 150–200° C. depending upon the epoxy resin/hardener system used. It was not necessary to cool before removal from the die. Results of the tests are shown below in Table 1 and it will be seen that there is a marked improvement in properties when the method of the invention is used.

It should be noted that in the table HR4C refers to an epoxy resin/ polysulphone mixture in accordance with Example 1 of our co-pending application Ser. No. 82,723, filed Oct. 21, 1970, now abandoned, DLS67A refers to a commercially available epoxy polysulphone mixture obtained from CIBA Ltd., L7558 is an epoxy novalac resin also commercially available from CIBA Ltd., and Anchor 1040 is a liquid $BF_3$ catalytic hardener.

TABLE 1

| Adhesive | Temperature (° C.) | Metal surface preparation | Peel strength (lbs./inch width) |
|---|---|---|---|
| Polysulphone | 22 | Etched | 10.5–11.7 |
|  | 22 | Etched but not primed | 0.6–0.8 |
| HR 4C | 22 | Etched and primed | 12.9–13.9 |
|  | 120 | ....do | 13.1–14.5 |
|  | 165 | ....do | 12.4–14.8 |
|  | 180 | ....do | 9.0–11.5 |
| DLS 67/A (CIBA epoxy/ polysulphone mixture). | 22 | Etched but not primed. | 5.4–6.0 |
|  |  | Etched and primed | |
| LY 558/Anchor 1040 (epoxy novolac/liquid $BF_3$ catalytic hardener). | 22 | Etched but not primed. | 10.4–11.8 |
|  |  | Etched and primed | 0 |
| LY 558/Anchor 1040/ polysulphone mixture. | 22 | Etched but not primed. | 2.0–2.6 |
|  |  | Etched and primed | 12.8–16.0 |
|  |  | primed. | 0.2–0.3 |

Note.—The steel used was SF67 stainless steel 0.004" thickness.

EXAMPLE 4

In this example similar test pieces to those in Example 3 were made but in this case polycarbonate was used instead of polysulphone for the primed coating. Using an epoxy/Anchor 1040/polycarbonate mixture as the adhesive, the peel strength for unprimed metal was 0.2 pound per inch width while the result for primed metal was 3.4 pounds per inch width.

EXAMPLE 5

In this example the test pieces used comprised strips of metal glued to the surface of a carbon fibre reinforced epoxy resin matrix, the test procedure used was to peel the metal strip off the surface of the fibre reinforced material at right angles to its length, the force required per inch width being determined. Using the same epoxy resin as in Example 2, the uncured fibre reinforced material was plied up in the normal fashion and the metal strip was placed on the surface, in one case as bare metal, and in the second case having a primer coating of polysulphone applied in a similar fashion to the preceding examples. The composite test pieces were then moulded at 165° C. producing metal faced composite specimens. A third test piece was made using fibre reinforced material made in a similar fashion to that of Example 2, and again the metal strip was pre-coated with fused polysulphone.

Test results are shown in Table 2 below:

TABLE 2

| Adhesive | Test temp. (° C.) | Peel strength (lbs./inch width) |
|---|---|---|
| HR4C with unprimed metal | 22 | 2.3–2.7 |
|  | 165 | 0.8–1.8 |
| HR4C with primed metal | 22 | 8.2–11.9 |
|  | 165 | 10.8–11.2 |
| Primed carbon fibre plus HR4C and primed metal. | 22 | 10.6–13.0 |
|  | 165 | 10.4–12.4 |

It will be seen that the method of the present invention provides an improvement in the properties tested both when used to improve adherence between the fibre reinforcement and its epoxy matrix and when used to improve adherence between metal and epoxy matrices, including the condition where the epoxy matrix is in the form of a very thin film between two metal surfaces. It will be appreciated that the present invention is useful in improving the overall properties of any fibre reinforced material having an epoxy matrix, in improving adherence between metal objects and in improving adherence between metal objects and fibre reinforced materials.

The following examples demonstrate that the method of the invention is applicable to a variety of resin/hardener mixtures and to aluminium as well as steel and carbon fibre parts.

EXAMPLE 6

Here the base material was etched stainless steel and a test procedure similar to that of Example 3 was used. The hardener used was dicyandiamide and the results are summarized in Table 3.

TABLE 3

|  | NY 750 |  | LY 558 |  |
|---|---|---|---|---|
| Polysulphone loading | 0 | 50 | 0 | 50 |
| Unprimed | 0.8 | 5.7 | 0.3 | 0.9 |
| Primed | 8.1 | 11.1 | 4.3 | 10.3 |

EXAMPLE 7

Here the base material and test procedure were as Example 6, but the hardener was diaminodiphenyl sulphone. Results are in Table 4.

TABLE 4

|  | NY 750 |  | LY 558 |  |
|---|---|---|---|---|
| Polysulphone loading | 0 | 35 | 0 | 35 |
| Unprimed | 0.3 | 0.6 | 0.4 | 0.3 |
| Primed | 2.9 | 3.8 | 7.7 | 3.3 |

EXAMPLE 8

In this example the base material was 0.020 inch thick chemically etched aluminium, while the test was as above and the adhesive used was HR4C. For the unprimed material the test results gave a mean of 1.9 lbs./inch width while primed material gave a mean of 11.1 lbs./inch width.

It is evident from the above three examples that the method of the invention is applicable to various hardener/resin combinations and to various materials.

It is also important to note that properties comparable or superior to those obtained with thermoplastics alone may be achieved by using epoxy resin in conjunction with thermoplastic. Furthermore it is possible to achieve these properties by moulding at normal epoxy processing temperatures e.g. 150° C.–200° C.

In the case of an all thermoplastic resin system it would be necessary to mould at considerably higher temperature e.g. 320° C. or above for polysulphone, and to cool under pressure before removal of moulding from the die.

We claim:
1. A method of joining a plurality of fibers by means of a matrix comprising an epoxy resin, said method including the steps of:
   (a) fusing onto said fibers a primer coating of a tough thermoplastic material selected from the group consisting of polyaryl sulphone, polyamide, phenoxy, polycarbonate, polysulphone, polyester, polyaryl ether and polyimide;
   (b) impregnating onto the thus coated fibers a matrix material consisting essentially of:
      (i) from 1 to 70 weight perecnt of a thermoplastic material selected from the group consisting of polyaryl sulphone, polyamide, phenoxy, polycarbonate, polysulphone, polyester, polyaryl ether and polyimide, and
      (ii) from 30 to 99 weight percent of an epoxy resin;
   (c) heating and pressing the coated, impregnated fibers together causing said epoxy matrix material to cure and causing interdiffusion between said thermoplastic primer coating and said matrix.
2. A method as claimed in claim 1 and in which the plurality of fibres is coated from a solution of thermoplastic, the coated fibres then being dried and heated to fuse the thermo plastic and to provide an even coating of the fibres, the coated fibres then being impregnated with an epoxy matrix.
3. A method as claimed in claim 2 and in which the coated fibres are impregnated with epoxy resin by transferring the resin from coated release paper to a tape or sheet of the fibres.
4. A method as claimed in claim 3 and in which the fibre comprises carbon fibre.
5. A method of providing an improved bond for joining a first metal part to a second metal part by means of a matrix comprising an epoxy resin, said method including the steps of:
   (a) fusing onto said first metal part a primer coating of a tough thermoplastic material selected from the group consisting of polyaryl sulphone, polyamide, phenoxy, polycarbonate, polysulphone, polyester, polyaryl ether and polyimide;
   ((b) fusing onto said second metal part a primer coating of a tough thermoplastic material selected from the group consisting of polyaryl sulphone, polyamide, phenoxy, polycarbonate, polysulphone, polyester, polyaryl ether and polyimide;
   (c) applying to either or both of the thus-coated parts of a matrix material consisting essentially of:
      (i) from 1 to 70 weight perecnt of a thermoplastic material selected from the group consisting of polyaryl sulphone, polyamide, phenoxy, polycarbonate, polysulphone, polyester, polyaryl ether and polyimide, and
      (ii) from 30 to 99 weight percent of an epoxy resin;
   (d) joining the two coated metal parts together with said epoxy matrix therebetween, and heating said matrix and said coated parts to cause said matrix material to cure and to cause interdiffusion between said thermoplastic primer coatings and said matrix.
6. A method of providing an improved bond for joining a metal part to a plurality of fibers assembled into a fiber part by means of a matrix comprising an epoxy resin, said method including the steps of:
   (a) fusing onto said metal part a primer coating of a tough thermoplastic material selected from the group consisting of polyaryl sulphone, polyamide, phenoxy, polycarbonate, polysulphone, polyester, polyaryl ether and polyimide;
   (b) fusing onto said purality of fibers a primer coating of a tough thermoplastic material selected from the group consisting of polyaryl sulphone, polyamide, phenoxy, polycarbonate, polysulphone, polyester, polyaryl ether and polyimide;
   (c) applying to either or both of the thus-coated parts of steps (a) and (b) a matrix material consisting essentially of:
      (i) from 1 to 70 weight percent of a thermoplastic material selected from the group consisting of polyaryl sulphone, polyamide, phenoxy, polycarbonate, polysulphone, polyester, polyaryl ether and polyimide, and
      (ii) from 30 to 99 weight percent of an epoxy resin;
   (d) joining the two parts together with said epoxy matrix therebetween and heating said matrix and said coated part to cause said matrix material to cure and to cause interdiffusion between said thermoplastic primer coating and said matrix.
7. A method as claimed in claim 6 and in which the metal member is joined to a matrix comprising epoxy resin reinforced by carbon fibres.
8. A method as claimed in claim 5 and in which the metal comprises stainless steel.

References Cited

UNITED STATES PATENTS

| | | | |
|---|---|---|---|
| 2,884,339 | 4/1959 | Dannenberg | 117—72 |
| 2,992,132 | 7/1961 | Melamed | 117—75 |
| 2,901,377 | 8/1959 | Bode | 117—72 |
| 3,214,286 | 10/1965 | Ramberger | 117—72 |
| 3,556,844 | 1/1971 | Marzocchi | 117—72 |
| 3,563,789 | 2/1971 | Moore | 117—75 |
| 2,784,210 | 3/1957 | Le Fave | 260—79.3 A |
| 3,406,126 | 10/1968 | Litant | 252—511 |
| 3,508,874 | 4/1970 | Rulison | 23—209.1 |

ALFRED L. LEAVITT, Primary Examiner

B. J. LEWRIS, Assistant Examiner

U.S. Cl. X.R.

156—230, 309, 310, 330; 117—72, 75, 76 T, 127, 132 BE, 161 ZB